United States Patent [19]

Johannes

[11] Patent Number: 4,504,944
[45] Date of Patent: Mar. 12, 1985

[54] BRIDGING CHANNEL PORT MODULE

[75] Inventor: Virgil I. Johannes, Holmdel, N.J.

[73] Assignee: AT&T Bell Laboratories, Murray Hill, N.J.

[21] Appl. No.: 377,718

[22] Filed: May 13, 1982

[51] Int. Cl.³ .............................................. H04J 3/00
[52] U.S. Cl. ...................................... 370/84; 370/104
[58] Field of Search .......................... 370/84, 104, 95

[56] References Cited

U.S. PATENT DOCUMENTS

| | | | |
|---|---|---|---|
| 3,781,818 | 12/1973 | Pardoe et al. | 370/84 |
| 3,838,221 | 9/1974 | Schmidt et al. | 370/104 |
| 3,982,077 | 9/1976 | Clark et al. | 370/84 |
| 4,160,128 | 7/1979 | Texier | 370/84 |
| 4,224,473 | 9/1980 | Kaul et al. | 370/104 |
| 4,229,815 | 10/1980 | Cummiskey | 370/84 |

OTHER PUBLICATIONS

IBM Technical Disclosure Bulletin; vol. 18, No. 10, "Concentrating Low-Speed Lines into a High-Speed Link"; Blanc et al., pp. 3313-3314.

Primary Examiner—Douglas W. Olms
Assistant Examiner—Frank M. Scutch, III
Attorney, Agent, or Firm—Erwin W. Pfeifle

[57] ABSTRACT

The present invention relates to a channel port module (16) capable of being bridged with a plurality of similar channel port modules onto a single first data rate communication line existing between a hub office (10) and a satellite earth station (12). Each channel port module is in communication with a separate sub-rate user and functions to extract the portion, or channel set, of the first data rate communication signal from the hub office destined for its associated user. Each channel port module also functions to insert a sub-rate return message onto its allocated portion of the return first data rate communication signal which is transmitted back to the hub office. The channel port modules are bridged in parallel onto the communication line, thereby achieving simultaneous reception of the first data rate signal by the plurality of channel port modules sharing the same communication line. Each channel port modules comprises a first divider (22) and a second divider (24) to extract its associated channel set from the plurality of channels included in the first data rate signal. The value associated with the first divider, L, is equal to the number of channels dedicated to each user, and the value associated with the second divider, M, is equal to the number of channel port modules bridged onto a single communication line. Thus, to obtain complete utilization of the communication signal, LM should be equal to the total number of channels on the first data rate communication signal.

4 Claims, 3 Drawing Figures

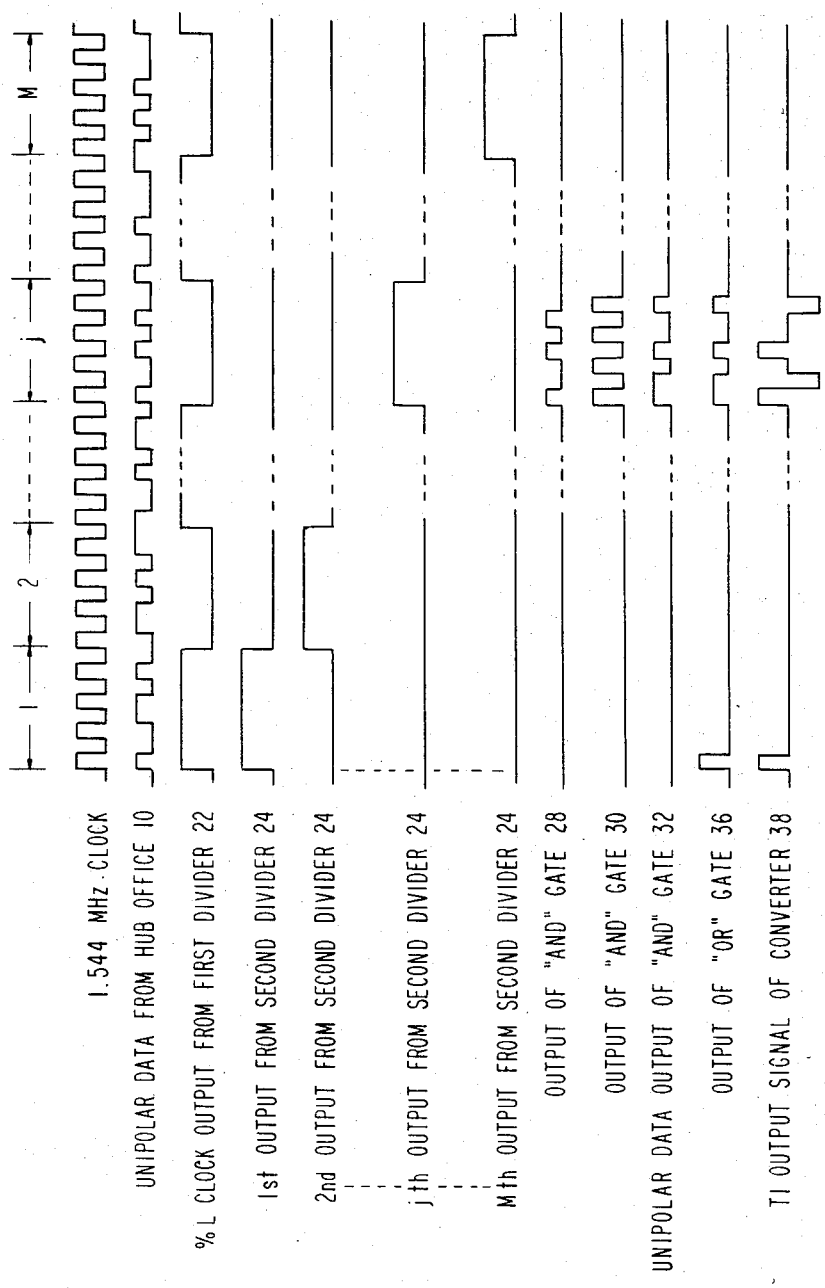

BRIDGING CHANNEL PORT MODULE

BACKGROUND OF THE INVENTION

1. Field of the Invention

The present invention relates to a channel port module (CPM), and more particularly, to a channel port module or terrestrial interface module (TIM), capable of being bridged in parallel with other channel port modules employed at a remote satellite earth station handling synchronous sub-T1 traffic from a plurality of separate users in a manner whereby separate multiplexers-demultiplexers are not required at the hub office earth station to communicate with the plurality of separate users.

2. Description of the Prior Art

Conventionally, the equipment at an earth station is divided into equipment which is commonly employed for the entire earth station and equipment which is unique to each of the various information ports. A typical example of this can be found in U.S. Pat. No. 3,838,221 issued to Schmidt et al on Sept. 24, 1974, wherein the common equipment includes transmit and control equipment, a multiplexer and a demultiplexer, and a plurality of terrestrial interface modules (or TIMs) which are unique to each of the different information ports. A consequence of this arrangement of hardware at a TDMA earth station is a large amount of equipment duplication. More particularly, the equipment employed to change the information bit rate employs a pair of memories. In a first TDMA frame, information is written continuously into one of the memories at a bit rate the same, or nearly the same, as the rate at which the information is received. Simultaneous with writing into one of these memories, the other memory is prepared for, or actually engaged in, reading out the information previously written therein at a much higher rate. On the next frame the function of the memories is interchanged so that, while the first memory is read, the second is being written into. These functions require an address counter for properly storing and retrieving the received information and pulse sources to operate these addressing counters. Thus, each of the TIMs employed must contain equipment to perform these functions.

An alternative arrangement wherein the TIMs are essentially eliminated as stand-alone devices and instead their functions are incorporated within the multiplexer-demultiplexer is disclosed in U.S. Pat. No. 4,224,473 issued to Kaul et al on Sept. 23, 1980. Incorporation of this equipment simultaneously allows elimination of the many high speed line buffers and drivers previously required to connect various control signals from the multiplexer-demultiplexer to the plurality of TIMs, and also eliminates much of the equipment duplication by employing common equipment in the multiplexer-demultiplexer to perform the functions at the various ones of the ports in the multiplexer-demultiplexer. The multiplexer-demultiplexer is capable of converting plural asynchronous terrestrial signal inputs into a burst signal or signals for transmission and for converting a received burst signal into plural asynchronous terrestrial signals for coupling to a terrestrial network and includes a plurality of input ports, each of the input ports including an elastic buffer for writing therein in response to data received at the port at a rate commensurate with the rate of receipt of data at the port.

Many earth station arrangements comprise a plurality of separate earth stations which communicate with the users via existing T1 (1.5 Mb/s) lines. However, most communications to be transmitted over these T1 lines originate with users which operate at a sub-T1 rate, usually 64 kb/s (termed DSO rate), and are, for the most part, synchronous signals. Therefore, the above-described Kaul et al arrangement requires additional multiplexing equipment besides that which is required to establish earth station-to-earth station communication in a TDMA environment.

The problem remaining in the prior art, therefore, is to provide a means for efficiently utilizing the existing T1 facilities without requiring a separate multiplexer-demultiplexer at each interface unit.

SUMMARY OF THE INVENTION

The problem remaining in the prior art has been solved in accordance with the present invention which relates to a channel port module (CPM), and more particularly, to a channel port module, or terrestrial interface module (TIM) capable of being bridged in parallel with other channel port modules employed at a remote satellite earth station handling synchronous sub-T1 traffic from a plurality of separate users in a manner whereby separate multiplexer-demultiplexers are not required at the earth station to communicate with the plurality of separate users.

It is an aspect of the present invention to provide a means for allowing a plurality of satellite earth station users, which normally transmit and receive data at sub-T1 rates, to communicate with the hub office over a single existing T1 line connection, instead of dedicating an entire T1 line to each separate user.

It is another aspect of the present invention to achieve efficient usage of the existing T1 facilities between the hub office and the satellite earth stations without requiring each sub-T1 rate user to perform expensive and timely multiplexing and demultiplexing operations.

Other and further aspects of the present invention will become apparent during the course of the following description and by reference to the accompanying drawings.

BRIEF DESCRIPTION OF THE DRAWING

Referring now to the drawings, where like numerals represent like parts in several views:

FIG. 3 includes a timing diagram illustrating the value of the various signals that exist in different portions of an exemplary channel port module.

DETAILED DESCRIPTION

Figure 1:
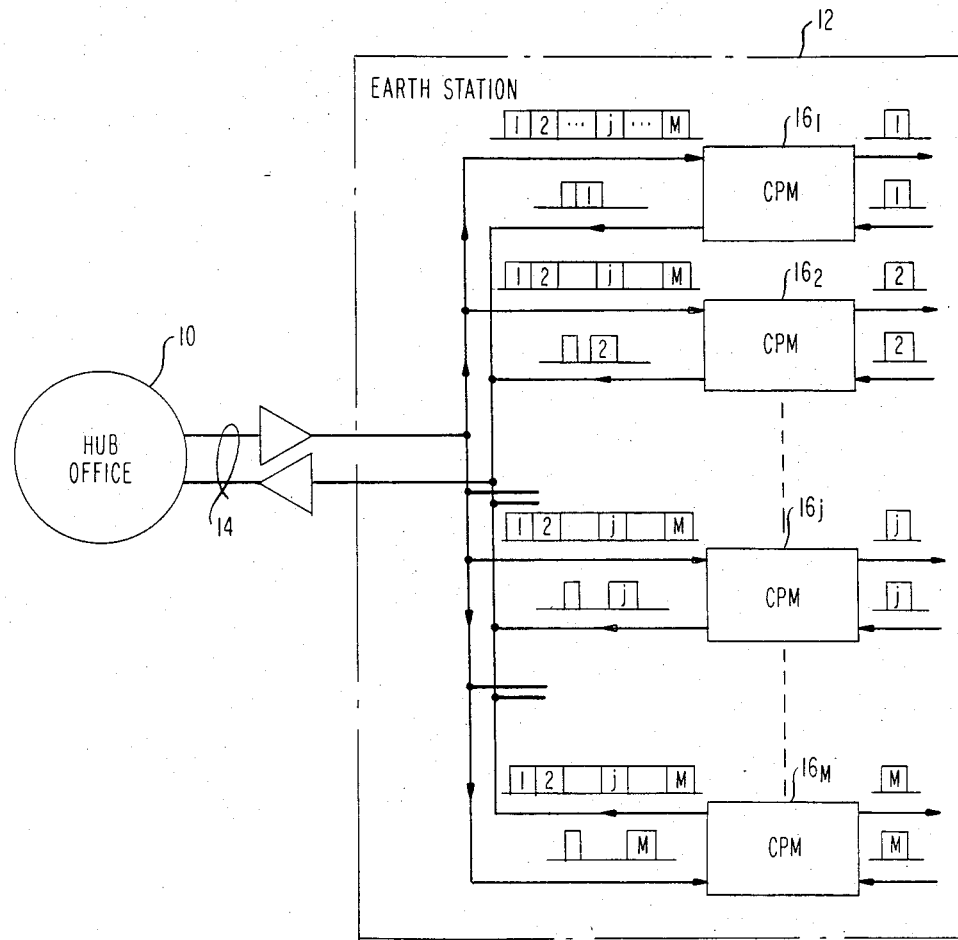
FIG. 1 illustrates an exemplary interconnection of a hub office and an earth station formed in accordance with the present invention.

An interconnection of an earth station employing bridging channel port modules (CPMs) in accordance with the present invention is illustrated in FIG. 1. A hub office 10, which may also be termed a central office, is connected to an earth station 12 via existing T1 lines 14. Earth station 12 comprises a plurality of M channel port modules $16_1$–$16_M$, where each separate CPM is associated with a different low bit rate user that wishes to communicate with hub office 10 via earth station 12. Each of these users is also associated with a distant earth station and hub, not shown in FIG. 1. Each CPM receives from the hub the T1 signal destined for the associated earth station and by employing the arrangement of the present invention, which will be discussed in greater detail hereinafter in association with FIG. 2, functions to process only the portion of the T1 signal destined for the specific user associated with the particular CPM. Similarly, earth station 12 receives signals from one or more other earth stations via the satellite, and combines these by the arrangement of the present invention into a single T1 signal which is transmitted via T1 lines 14 to hub office 10.

Specifically, as shown for earth station 12 in FIG. 1, the T1 signal on line 14 is divided into M portions, each portion associated with a separate one of the M channel port modules (CPMs) $16_1$–$16_M$. CPM $16_1$ receives the entire T1 signal, typically 24 channels, but functions to recognize and process only the first L-length portion, comprising L channels, as shown by the signal diagram portion labeled "1" at the output of CPM $16_1$ of FIG. 1. Also, CPM $16_1$ transmits a return signal to hub office 10 which occupies the same position in the T1 signal as the portion received by CPM $16_1$. In a like manner, $CPM_2$ receives the entire T1 signal but recognizes and processes only the second L-length portion of the T1 signal. $CPM_2$ also transmits back to hub office 10 a data stream during the second L-length portion of the return signal. Similarly, $CPM_M$ receives the entire T1 signal, processes only the last, or $M^{th}$, L-length portion and transmits a return signal to hub office 10 in the $M^{th}$ portion of the return T1 signal. It is to be understood that T1 signal 14 arrives simultaneously at each CPM $16_1$–$16_M$, and the above-described processing operations occur in parallel.

In order to utilize the entire allocation of the T1 signal, which includes 24 channels, the number of separate users, M (where each user is identified by a unique CPM), and the number of channels allocated thereto, L, when multiplied together, should yield 24. For example, an exemplary arrangement may comprise six CPMs, where each of the six users is allocated four out of the twenty-four channels. Alternatively, a particular earth station may consist of eight users, each user occupying three channels. Further, in accordance with the present invention, an earth station may be reconfigured to allocate channels where necessary. That is, perhaps only four users require the service of a particular earth station, instead of the six the earth station was designed for. Each of the four CPMs involved may then be altered to accommodate a separate pair of the eight extra channels. Generally, any combination of M CPMs and L channels/CPM may be employed as long as the product formed by multiplying M by L does not exceed twenty-four.

Figure 2:
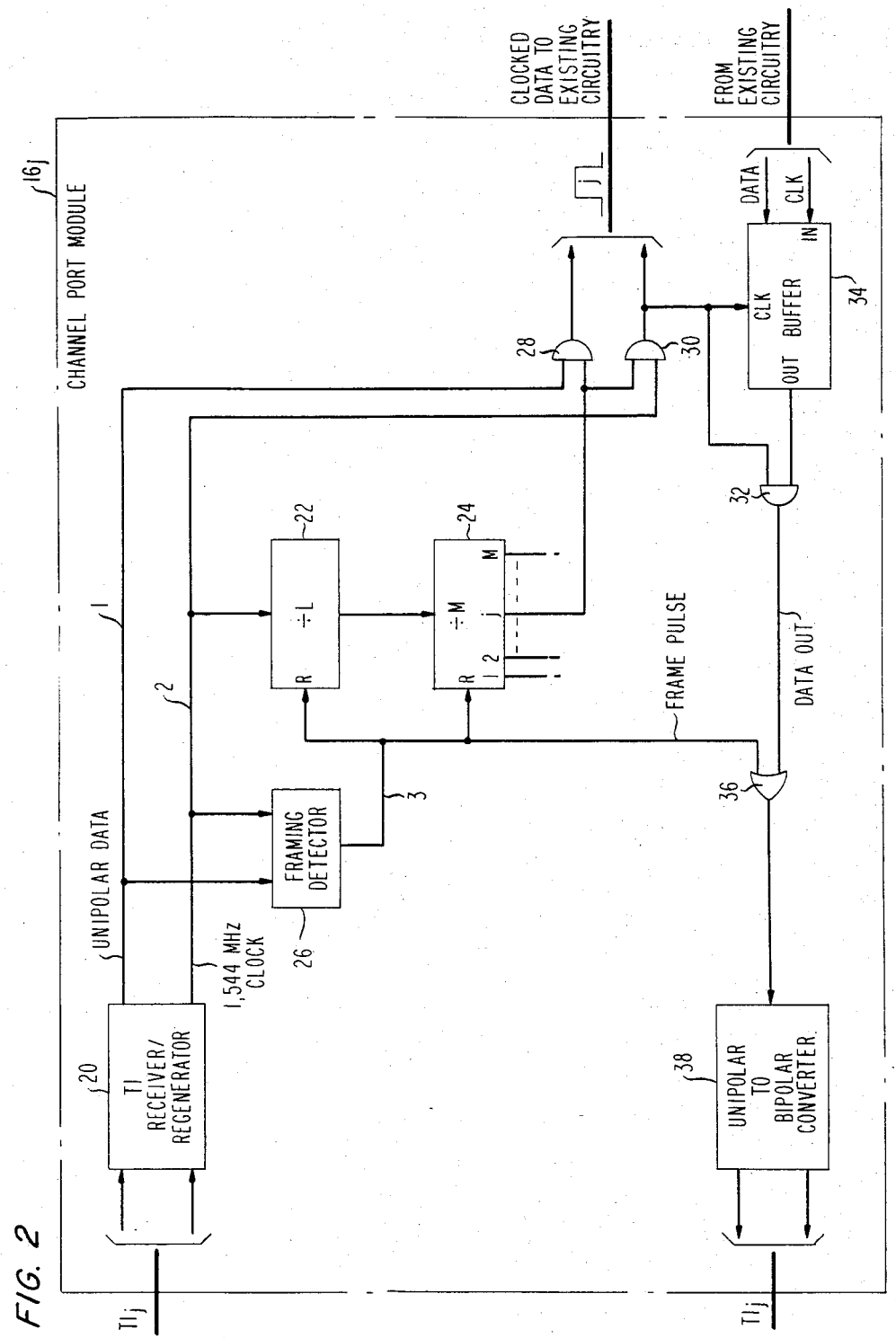
FIG. 2 illustrates an exemplary detailed configuration of a channel port module formed in accordance with the present invention.

An exemplary CPM $16_j$ formed in accordance with the present invention is illustrated in detail in FIG. 2. The input to CPM $16_j$, as defined hereinabove in association with FIG. 1, is the entire T1 signal $T1_j$, transmitted in a 1.544 megabit-per-second (Mb/s) pulse stream. Signals are applied directly to cable pairs in a bipolar format in which positive or negative pulses, always alternating, represent one state and ground represents the other state. A T1 receiving regenerator 20, shown in FIG. 2, is responsive to the T1 signal applied as an input to CPM $16_j$. Regenerator 20, which is well known in the art, performs three functions: (1) equalization of the input pulse stream to correct for linear distortion, (2) timing extraction, and (3) decision as to the value of the input pulse information, with corresponding regeneration of a correct and properly shaped output pulses stream. T1 lines are self-timed; that is, timing information is extracted from the input waveform. Since a bipolar signal spectrum has a null at the signaling rate, timing cannot be extracted directly from the bipolar signal; it is convenient to convert it to a unipolar signal to extract the timing information. Rectification and clipping is one way to achieve this, with an appropriate tuned circuit used to recover the timing information. The recovered unipolar data and 1.544 MHz clock are produced as separate outputs by regenerator 20, where as shown in FIG. 2, the unipolar data is propagated along output line 1 and the 1.544 MHz clock is propagated along output line 2. A timing diagram illustrating both the unipolar data and clock signals is illustrated in FIG. 3.

Output line 2, which carries the 1.544 MHz clock, is subsequently applied as an input to a first divider 22. As shown, first divider 22 is a divide-by-L divider, where L, as defined in association with FIG. 1, is the number of channels from the 24 channel T1 signal associated with CPM $16_j$. In association with the previous discussion of FIG. 1, the number L may be, for example, 4, where, therefore, there are at most six CPMs at the associated earth station. Assuming that L is equal to four, the output of first divider 22, therefore, will be a clock signal operating a 0.386 (1.544/4) MHz. As shown in the timing diagram of FIG. 3, this output clock rate of first divider 22 will thus alternate states at the initiation of each succeeding L-length portion of the 24 channel T1 signal.

As shown in FIG. 2, the output clock signal of first divider 22 is subsequently applied as an input to a second divider 24. As shown, second divider 24 is a divide-by-M divider, where the value of M, as defined hereinabove in association with FIG. 1 is chosen such that L multiplied by M is equal to twenty-four. Second divider 24 functions to separate the individual clock pulses generated by first divider 22, where each separate clock pulse is associated in a one-to-one relationship with the M CPMs employed at an exemplary earth station. In particular, the first output of second divider 24 is the clock pulse associated with CPM $16_1$ (not shown), the second output of second divider 24 is the clock pulse associated with CPM $16_2$ (not shown), and, in general, the $j^{th}$ output of second divider 24 is the clock pulse associated with $CPM_j$. For illustrative purposes, the timing diagram of FIG. 3 includes the clock pulses associated with CPMs $16_1$, $16_2$, $16_j$ and $16_M$.

A framing detector 26 included in CPM $16_j$ of FIG. 2 is also responsive to both the unipolar data and 1.544 MHz clock outputs of T1 regenerator 20. Framing detector 26 functions to recognize the beginning of each succeeding 24 channel T1 frame and produce as an output a frame pulse, as illustrated in the timing diagram of FIG. 3, at the beginning of each frame. The frame pulse is applied as an input to both first divider 22 and second divider 24 and functions to reset both dividers at the beginning of each frame.

In association with CPM $16_j$, the $j^{th}$ clock signal output of second divider 24 is applied as a first input to an AND gate 28, where the second input to AND gate 28 is the unipolar data stream at output line 1 of T1 regenerator 20. The $j^{th}$ clock signal, as shown in the timing diagram of FIG. 3, will function to activate AND gate 28 during the $j^{th}$ portion of the unipolar data stream, and, therefore, the output of AND gate 28, as shown in the timing diagram of FIG. 3, will be that data originating at the hub office which is destined for the $j^{th}$ user of the associated earth station. Although not shown in association with CPM $16_j$ of FIG. 2 it is understood that the remaining M-1 users at the earth station receive their data streams in a similar manner, that is, by performing a logical AND operation on the combination of the unipolar data stream and the specific clock pulse identified with each user.

Returning to CPM $16_j$, since a clock signal is needed to synchronize the received data, the $j^{th}$ clock signal output from second divider 24 and the 1.544 MHz clock output from T1 regenerator 20 are applied as separate inputs to an AND gate 30. The output of AND gate 30, as illustrated in the timing diagram of FIG. 3, is, therefore, a 1.544 MHz which operates only during the $j^{th}$ portion of unipolar data stream. The output of AND gates 28 and 30 are subsequently applied as separate inputs to the remainder of the circuitry associated with the $j^{th}$ user's receiver (not shown).

To operate in the transmit mode, the clock signal appearing at the output of AND gate 30 is applied as an input to an AND gate 32, where the remaining input to AND gate 32 is the unipolar data stream the $j^{th}$ user desires to transmit back to the hub office. Since the $j^{th}$ user may generate data it desires to transmit at times other than its alloted $j^{th}$ interval of the T1 signal, the data is stored in a buffer 34. Buffer 34 is also responsive to the output clock signal from AND gate 30, and, therefore, buffer 34 will transmit a data stream to AND gate 32 only when activated by the $j^{th}$ clock signal. The output of AND gate 32, as illustrated in the timing diagram of FIG. 3, is, therefore, an L-length data stream which starts at the beginning of the $j^{th}$ portion of the return T1 signal.

The output signal of AND gate 32 is subsequently applied as a first input to an OR gate 36, where the second input to OR gate 36 is the frame pulse output signal from framing detector 26, and is denoted by the numeral 3 in FIG. 2. The output of OR gate 36, as shown in the timing diagram of FIG. 3, therefore includes both the frame pulse and the $j^{th}$ message of the transmit data stream. The frame pulse will be needed by the hub office to recognize the beginning of the frame in the received data.

The output of OR gate 36 is subsequently applied as an input to a unipolar-to-bipolar converter 38. Unipolar-to-bipolar converter 38 may comprise any arrangement well known in the art and functions to transform the unipolar data from the user into the bipolar format necessary for transmission. The output of converter 38, therefore, as illustrated in the timing diagram of FIG. 3, is in the format acceptable for transmission as a T1 signal back to the hub office.

Referring again to FIG. 1, the outputs of converter 38 of CPMs $16_1$–$16_M$ are combined by a parallel connection, and transmitted to hub office 10. The frame pulse in this combined output signal is only provided by one of the CPMs, so that the lead "FRAME PULSE" into gate 36 of FIG. 2 is only provided by one of the CPMs.

What is claimed is:

1. A TDMA interface for establishing communication between a hub office (10) operating at a first data rate (T1) and a plurality of M users each operating at a second data rate, where the first data rate is M times the second data rate, the interface comprising
   means (16) responsive to a received first data rate signal from the hub office which comprises succeeding N channel-length frames for separating said received first data rate signal into a plurality of M separate L channel-length second data rate synchronous signals, where ML is equal to N, said means also being responsive to a plurality of M transmit second data rate synchronous signals from the M separate users to form a single first data rate signal which is transmitted back to the hub office characterized in that
   the means comprises a plurality of M channel port modules, each channel port module associated with a separate one of the M users and responsive to the received first data rate signal from the hub office and a separate one of the M synchronous second data rate signals from a separate one of the plurality of M users for extracting from said received first data rate signal an L channel-length second data rate signal destined thereof, and also for inserting an L channel-length return synchronous second data rate signal onto the single first data rate signal transmitted back to the hub office from said means, each channel port module comprises
   regenerating means (20) for receiving the first data rate signal from the hub office and generating as separate outputs a received data stream (1) and a clock signal (2) related thereof;
   a framing detector (26) responsive to both the received data stream and the clock signal produced by said regenerating means for detecting the beginning of each succeeding frame of the received first data rate signal and generating as an output a frame pulse signal; and
   transmission means (22, 24, 28, 30) responsive to both said received data stream and said clock signal generated by said regenerating means and said frame pulse signal generated by said framing detector for generating as separate outs the L channel-length second data rate signal and an L channel-length clock signal destined for the user associated with the channel port module.

2. A TDMA interface formed in accordance with claim 1
   characterized in that
   the transmission means comprises
   a first divider (22) responsive to the clock signal output of the regenerating means for dividing said clock signal by a predetermined value (L) equal to the number of channels allocated to each of the plurality of M users to produce as an output a divide-by-L clock signal;
   a second divider (24) responsive to the divide-by-L clock signal produced by said first divider for producing a plurality of M output signals wherein each separate output signal comprises a clock pulse which extends during only a unique one of the M portions of the divide-by-L clock signal;
   a first AND gate (28) for receiving as separate inputs the received data stream from said regenerating means and the unique output clock pulse signal from said second divider and generating as an output the L channel-length second data rate signal produced by the transmission means and destined for the associated user; and
   a second AND gate (30) for receiving as separate inputs said unique output clock signal from said second divider and the clock signal output from said regenerating means and generating as an output the L channel-length clock signal produced by said transmission means and destined for the associated user.

3. A TDMA interface formed in accordance with claim 1 characterized in that each channel port module further comprises a data buffer (34) responsive to the L channel-length clock signal generated by the second AND gate and a return unipolar second data rate synchronous signal from the associated user which is destined for the hub office to generate as an output an L channel-length return unipolar second data rate synchronous signal;

timing means (32, 36) for receiving as separate inputs the L channel-length clock signal generated by the second AND gate, the L channel-length return unipolar second data rate synchronous signal generated by the data buffer, and the frame pulse signal generated by the framing detector to generate as an output a clocked L channel-length return unipolar second data rate synchronous signal; and converting means (38) responsive to the clocked L channel-length return unipolar second data rate synchronous signal generated by the timing means for generating therefrom a clocked L channel-length return bipolar second data rate synchronous signal and inserting said clocked L channel-length return bipolar second data rate synchronous signal onto the first data rate synchronous signal transmitted back to the hub office.

4. A TDMA interface formed in accordance with claim 3 characterized in that the timing means comprises a third AND gate (32) for receiving as separate inputs the L channel-length clock signal generated by the second AND gate and the L channel-length return unipolar second data rate synchronous signal from the associated user to generate as an output the clocked L channel-length return unipolar second data rate synchronous signal; and an OR gate (36) disposed between the third AND gate and the converting means for receiving as separate inputs the clocked L channel-length return unipolar second data rate synchronous signal generated by said third AND gate and the frame pulse generated by the framing detector to generate as an output the clocked L channel-length return unipolar second data rate signal with said frame pulse impressed thereon, said output signal subsequently applied as the input to said converting means.

* * * * *